United States Patent
Schmidt-Schaeffer

(10) Patent No.: US 6,669,141 B2
(45) Date of Patent: Dec. 30, 2003

(54) AIRCRAFT PASSENGER CABIN WITH ROTATABLE PASSENGER SEATS

(75) Inventor: Tobias Schmidt-Schaeffer, Stuttgart (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 09/999,075

(22) Filed: Nov. 30, 2001

(65) Prior Publication Data

US 2002/0070314 A1 Jun. 13, 2002

(30) Foreign Application Priority Data

Nov. 30, 2000  (DE) .......................... 100 59 603

(51) Int. Cl.⁷ .............................................. B64D 13/00
(52) U.S. Cl. .................................. 244/118.6; 297/344.1
(58) Field of Search ............................ 244/118.6, 118.5, 244/122 R; 297/240, 344.23, 344.24, 354.13

(56) References Cited

U.S. PATENT DOCUMENTS

| | | | | |
|---|---|---|---|---|
| 4,657,305 A | * | 4/1987 | Meiller ...................... 297/115 |
| 4,834,452 A | * | 5/1989 | Goodrich ................... 297/240 |
| 4,969,685 A | * | 11/1990 | Chihaya et al. .............. 108/20 |
| 5,024,398 A | * | 6/1991 | Riedinger et al. ......... 244/118.5 |
| 5,137,321 A | * | 8/1992 | Landry et al. .............. 296/24.1 |
| 5,161,765 A | * | 11/1992 | Wilson ...................... 248/425 |
| 5,383,629 A | * | 1/1995 | Morgan ................... 244/118.6 |
| 5,405,188 A | * | 4/1995 | Hanson ..................... 297/322 |
| 5,431,362 A | * | 7/1995 | Carnahan et al. ........... 248/159 |
| 5,568,960 A | * | 10/1996 | Oleson et al. .............. 248/418 |
| 6,000,659 A | | 12/1999 | Brauer |
| 6,059,364 A | | 5/2000 | Dryburgh et al. |
| 6,209,956 B1 | | 4/2001 | Dryburgh et al. |
| 6,213,552 B1 | * | 4/2001 | Miotto .................... 297/300.5 |
| 6,227,489 B1 | * | 5/2001 | Kitamoto et al. ........ 244/118.5 |

FOREIGN PATENT DOCUMENTS

| | | | |
|---|---|---|---|
| DE | 557267 A1 | * 8/1993 | .............. 244/118.5 |
| DE | 19544754 | 6/1996 | |
| JP | WO 9411247 A1 | * 11/1993 | ............. 244/122 R |

* cited by examiner

Primary Examiner—Robert P. Swiatek
Assistant Examiner—Susan Piascik
(74) Attorney, Agent, or Firm—W. F. Fasse; W. G. Fasse

(57) ABSTRACT

A passenger cabin of a passenger transport vehicle such as an aircraft includes single passenger seats arranged between an aisle and an outside cabin wall. Each seat is tiltably adjustable between an upright seating configuration and a reclined lying configuration, and is rotatable between a forward-facing orientation facing 0 to 18° relative to the cabin longitudinal axis, and an inwardly-turned orientation facing 50 to 60° relative to the longitudinal axis. The forward-facing orientation is for upright seating during take-off and landing. The inwardly-turned orientation provides additional leg room and sufficient space for the reclined lying configuration. The pitch spacing between seats can be minimized, and total seating capacity is high, while providing substantial space and comfort for each passenger. Screening partitions adjacent to the cabin wall and the aisle provide privacy screening and define a personal space allocated to each seat.

22 Claims, 6 Drawing Sheets

AIRCRAFT PASSENGER CABIN WITH ROTATABLE PASSENGER SEATS

PRIORITY CLAIM

This application is based on and claims the priority under 35 U.S.C. §119 of German Patent Application 100 59 603.7, filed on Nov. 30, 2000, the entire disclosure of which is incorporated herein by reference.

FIELD OF THE INVENTION

The invention relates to a passenger cabin and especially an aircraft passenger cabin with an arrangement of passenger seats, which are each adjustable from a seating position with a substantially upright backrest to a lying or reclining position with a lowered backrest, and which overlap one another in the forward and aft direction at least along the outer fuselage walls of the passenger cabin.

BACKGROUND INFORMATION

German Patent Laying-Open Document 195 44 754, and especially FIGS. 3, 4 and 22 thereof, show seat layouts of an area in an aircraft passenger cabin. The possible arrangement of passenger seats according to FIG. 22 of this reference provides seat units which are oriented in the aircraft longitudinal direction or slightly rotated relative to the aircraft longitudinal direction. Particularly, the rotational orientation is adapted to the curve or angling of the outer fuselage wall of the aircraft cabin. In such an embodiment, a sufficient seat pitch spacing between successive seats is necessary, not only to allow a passenger to sit comfortably in the seat in its upright position, but also to allow the passenger to recline or lie on the seat in its reclining position. A sufficient amount of space must also be provided to allow for adjusting the seat unit from the sitting position to the lying or reclining position.

Moreover, in the area in the cabin transitioning to the normal maximum cabin width, this reference shows a double or twin seat arrangement with two passenger seats arranged next to one another. In such a seating arrangement, the passenger seated in the window seat will have a considerable problem of limited and difficult access, when the aisle seat (i.e. the seat positioned toward the aisle) is adjusted to the sleeping or reclining position. Particularly, the window seat passenger cannot leave his seat without disturbing the aisle seat passenger. This reduces the comfort and contentment of the passengers especially during long distance flights. The aisle seat passenger must constantly fear being disturbed by the window seat passenger and can therefore not rest in a relaxed and undisturbed manner, while the window seat passenger is uncomfortable or anxious, because he does not wish to disturb the aisle seat passenger each time he wants to leave his seat and step into the aisle.

FIGS. 3 and 4 of this reference (DE OS 195 44 754) disclose alternative arrangements which aim to avoid such a double or twin seating arrangement, without requiring such a large seat spacing distance as would be necessary to enable a reclined position of the seats arranged one behind the other. In this context, FIG. 3 of the reference shows an arrangement of the seats being angled to face somewhat outwardly relative to the longitudinal axis of the aircraft. On the other hand, FIG. 4 of the reference shows an arrangement of seats angled to face somewhat inwardly relative to the longitudinal axis of the aircraft. Thus, FIGS. 3 and 4 of the reference disclose an overlapping configuration in which the seat spacing can correspond to the typical spacing for first-class seats in connection with the use of conventionally known double or twin seat arrangements. Thereby, a free accessibility to access each passenger seat is ensured. However, due to the arrangement of a primary seat and a secondary seat together in a seating unit, this requires and defines a fixed arrangement of this overlapping configuration, with fixed dimensions adapted to the lying or reclining position of the seats. The space required for such an arrangement is suitable for a first-class passenger in a first-class cabin, but can also be realized in the other class cabins in which a less generous amount of space is allocated to each passenger seat.

SUMMARY OF THE INVENTION

In view of the above, it is an object of the invention to achieve an optimal utilization of the available cabin space especially in a passenger cabin with a limited space availability, while providing an adequate space for the free movement of each passenger in combination with a private area for each passenger, so as to achieve a high degree of comfort and contentment for the passengers, especially during long distance flights. The invention further aims to avoid or overcome the disadvantages of the prior art, and to achieve additional advantages, as apparent from the present specification.

The above objects have been achieved according to the invention in an arrangement of passenger seats in a passenger cabin, and especially an aircraft passenger cabin. Each passenger seat is adjustable between a seating position with a substantially up-right backrest, and at least one lying or reclining position with a lowered or reclined backrest. The seats are arranged in an overlapping configuration with respect to the forward and aft longitudinal direction, especially along the outer fuselage wall of the passenger cabin. Particularly according to the invention, the passenger seats along the outer wall of the passenger cabin are embodied as single or individual seats which are rotatable or pivotable, especially about a substantially vertical axis, between a substantially forward-facing rotational orientation and an inwardly-turned rotational orientation in which the passenger seat is rotated partly inwardly toward the central longitudinal axis of the passenger cabin. These seats are to be adjusted to the substantially forward-facing rotational orientation during the take-off and landing phases of a flight, while they may be adjusted to the inwardly-turned rotational orientation during the cruise flight phase.

It is especially advantageous according to the invention, that the inventive seat arrangement can provide both a sitting position and a lying or reclining position for the passengers, and can thereby increase the comfort and contentment of the passengers, even with a relatively smaller seat pitch spacing between successive seat rows, and a smaller amount of space allocated to each passenger or to each seat in comparison to the first-class cabin.

According to particular preferred embodiments of the invention, for example, in the inwardly-turned rotational orientation, the seats will be facing somewhat forwardly and pivoted inwardly toward the cabin mid-line at an angle of approximately 50 to 60° relative to the longitudinal axis of the aircraft. On the other hand, in the substantially forward-facing rotational orientation, the seats will be oriented facing in an angular range from 0 to about 18° inwardly toward the middle of the cabin, relative to the longitudinal axis of the cabin. Further according to the invention, separating walls, partitions, or screens are preferably arranged respectively between each seat and the neighboring seat in a direction generally toward the outer wall of the passenger cabin, and between each respective seat and the adjoining or neighboring seat in a direction generally toward the middle or the aisle of the passenger cabin.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
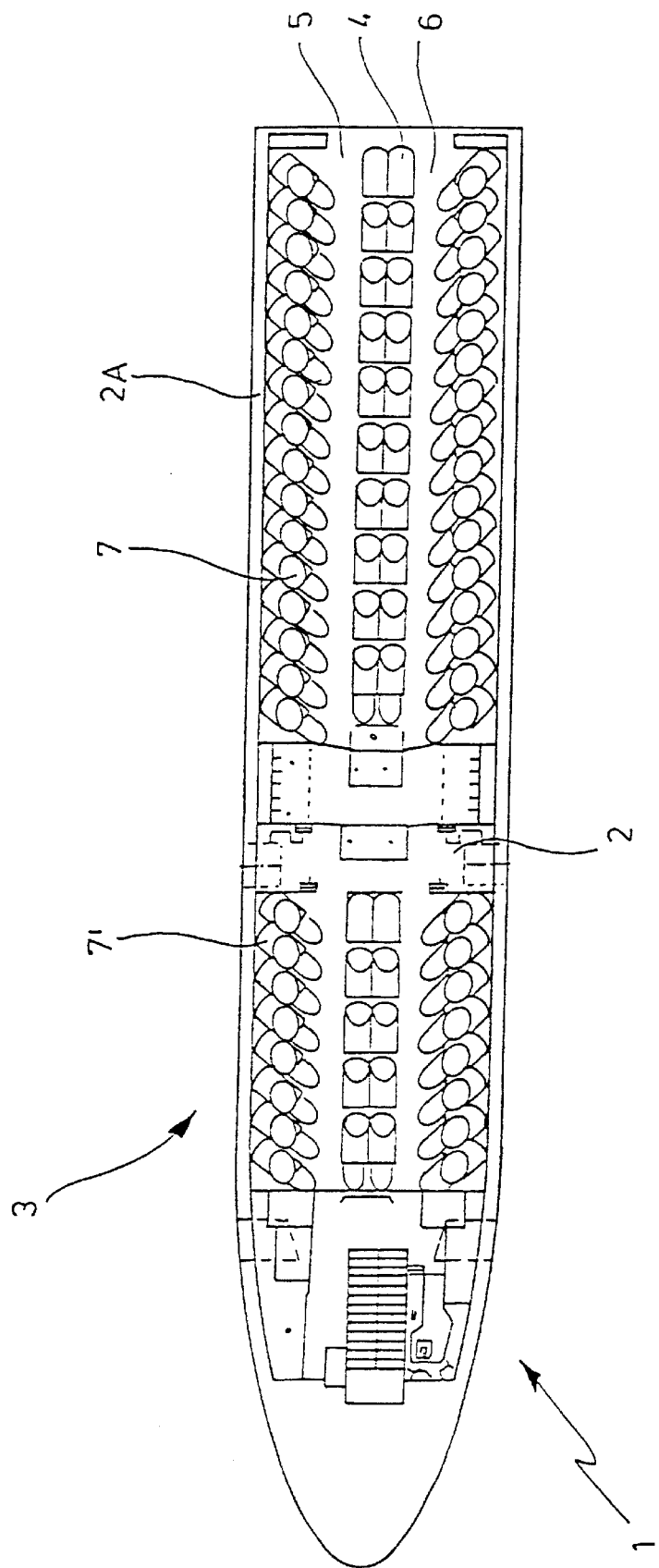
FIG. 1 is a schematic top plan view of the cabin layout of a passenger aircraft equipped with a passenger seat arrangement according to the invention.

FIG. 1 shows a top plan view of the forward portion of a passenger aircraft 1, particularly showing the cabin layout of a passenger cabin 2 within the aircraft 1. The cabin 2 includes a passenger seat arrangement 3, which is equipped with double or twin seats 4 in the middle area of the passenger cabin 2, between two aisles 5 and 6, as well as single or individual seats 7 arranged along the outside walls 2A of the passenger cabin 2. Note that the outside walls 2A of the cabin 2 are preferably provided with cabin windows, which are not shown in this view of FIG. 1, however.

The middle seats 4, embodied as double or twin seats 4 are arranged facing directly forward in the aircraft longitudinal direction, and the successive rows of these middle seats 4 are spaced apart from one another by a seat spacing distance that is selected to provide adequate leg room for the passengers, and also to enable a lying or reclining configuration of the middle seats 4. For this purpose, for example, a seat spacing of 142.5 cm is necessary, in order to enable a complete lowering or reclining of the backrest so as to provide a comfortable and useable sleeping or lying surface for a passenger of a standard height of 195 cm. It is apparent that there is a certain overlap of the middle seats 4 in the longitudinal direction, when successive seats 4 are adjusted to the lying or reclining configuration, because the standard height (or length when lying down) of a passenger is 195 cm, while the seat spacing is 142.5 cm. Such an overlap of the reclining surfaces of successively arranged seats is tolerated as a compromise between minimizing the seat spacing distance for economic reasons, while still offering a reasonable sleeping or reclining configuration for the passengers.

The double or twin seats 4 are, however, only useable as middle seats 4 along the centerline of the cabin 2 in the inventive arrangement, because arranging double seats along the outside walls 2A of the cabin 2 would cause considerable disadvantages of poor accessibility and the like, as discussed above. Thus, according to the invention, individual or single seats 7 (also called outer seats and window seats herein) are arranged along the outside wall 2A of the passenger cabin 2, typically in the area of cabin windows 8 (shown e.g. in FIG. 2). These single seats 7 ensure an optimal accessibility without disturbing neighboring passengers.

An arrangement of single seats as a simple direct replacement of a possible arrangement of twin seats in the same amount of space would result in an overall loss of seating capacity, which would not be acceptable to the operator of the passenger aircraft, for economic reasons. Therefore, the single seats or outside seats 7 are arranged with a smaller seat pitch spacing between successive seats, which avoids or at least reduces the loss of seating capacity relative to the arrangement of twin seats. For example, in the illustrated embodiment, a seat spacing distance of 91.6 cm (36 inches) is provided for the outside single seats 7. This seat spacing of the outside seats 7 is thus about 64% of the seat spacing of the middle seats 4 in the present embodiment, but may be in a range of 60 to 70% for example. Thereby, the arrangement of single seats 7 can provide about 70 to 80% of the seating capacity of twin seats arranged at the necessary larger spacing, in the same amount of cabin floor space.

While the reduced seat pitch spacing of the outside single seats 7 is adequate to allow comfortable upright seating in a forward-facing orientation, it does not allow the seat 7 to be reclined to provide a sleeping or reclining surface. Therefore, the invention must provide additional features to optimize the useful space for the passengers' comfort. Particularly, the outside single seats 7 are arranged on a pedestal or on a support base allowing rotation, so that each seat 7 is individually rotatable about a substantially vertical axis (i.e. an axis that is orthogonal to the cabin floor). Each seat 7 is then pivotable or rotatable in a limited angular range, between a substantially forward-facing orientation suitable for take-off and landing phases of a flight, and an inwardly-turned orientation suitable for cruise flight phases of a flight.

In a preferred embodiment, the outside seats 7 in the substantially forward-facing orientation are not aligned exactly facing forward in a direction parallel to the aircraft longitudinal axis. Instead, even in the substantially forward-facing orientation, the seats are rotated slightly inwardly toward the centerline of the cabin 2, in a range up to about 18°, for example in a range from 8 to 18°, inwardly relative to the longitudinal axis of the aircraft. Such a slightly inwardly tilted orientation is advantageous to provide increased leg room and improved accessibility to each seat 7, while still ensuring that any inertial forces or acceleration forces that may arise during take-off and landing of the aircraft are not uncomfortable for the passengers seated in the seats 7 in the substantially forward-facing orientation. This orientation of the seats can be seen especially in FIGS. 2 and 5.

Once the aircraft has taken off, and the general flight phase begins (for example being indicated to the passengers by switching off a "fasten seat belts" sign or the like), then the seats 7 can be rotated from the substantially forward-facing orientation to the inwardly-turned orientation, in which there is then adequate space for optionally adjusting the seats 7 from an upright seating configuration to a reclined or lying configuration. The aisle width of the aisles 5 and 6 is also adequate for allowing such a reclined configuration and inwardly-turned orientation of the seats 7, because the individual seats 7 can be arranged relatively close to the outside walls 2A of the cabin 2, which thereby provides an enlarged width of the aisles 5 and 6 in comparison to a situation in which double or twin seats are arranged along the outside wall 2A of the cabin 2. Particularly, the outside seats 7 are oriented in a range between 50 and 60°, and preferably about 54°, relative to the aircraft longitudinal axis, in the inwardly-turned orientation. While this angular range for the inwardly-turned orientation achieves an optimal utilization of the available space, a rotation of the outside seat 7 beyond this range is also possible, as long as the width of the aisle between the outside seats 7 and the middle seats 4 is sufficient.

Figure 3:
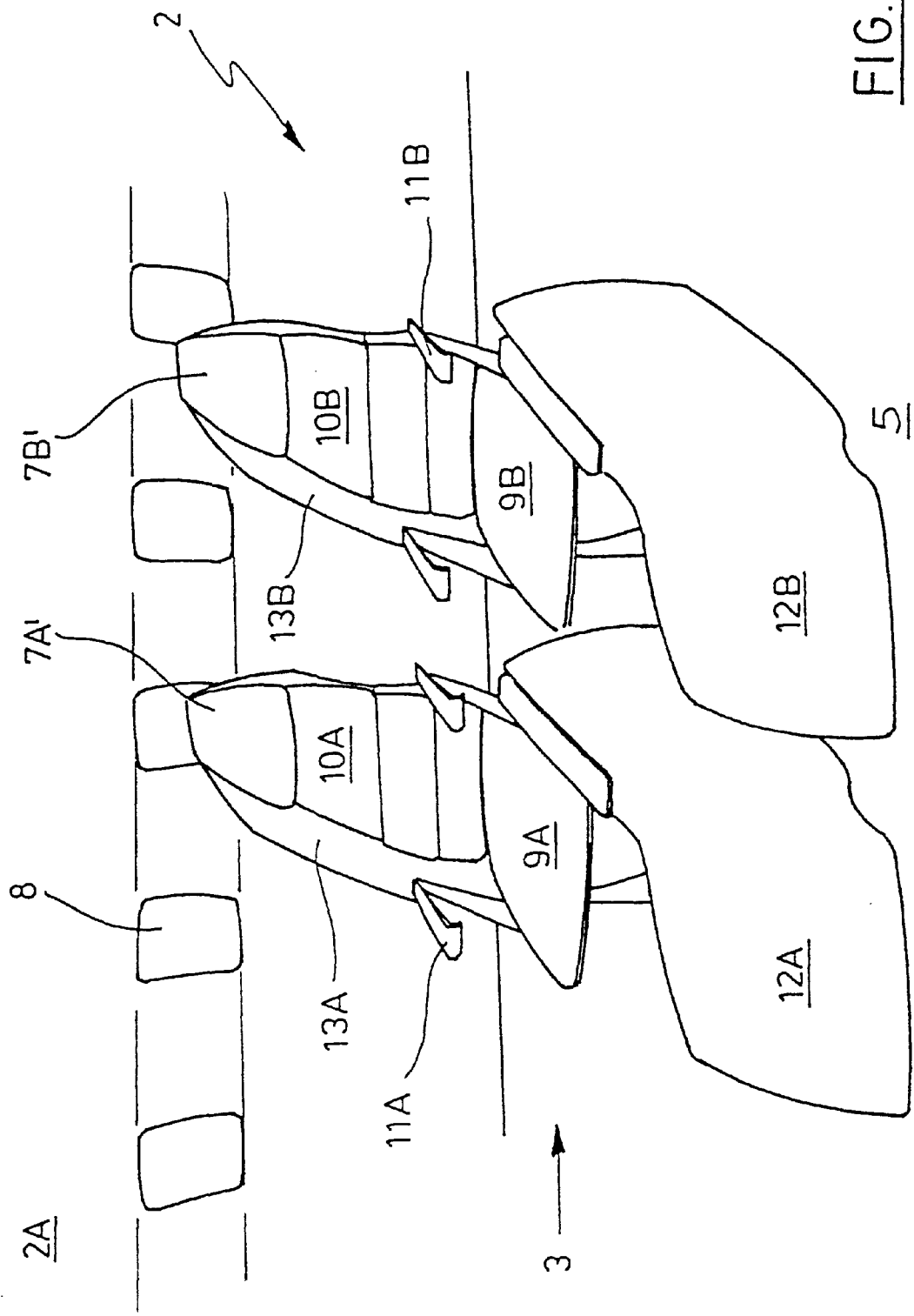
FIG. 3 is a view generally similar to that of FIG. 2, and showing the passenger seat arrangement according to FIG. 2, but in an inwardly-turned orientation that may be selected during the cruise flight phase of a flight, wherein the passenger seats are in an upright seating configuration.
Figure 4:
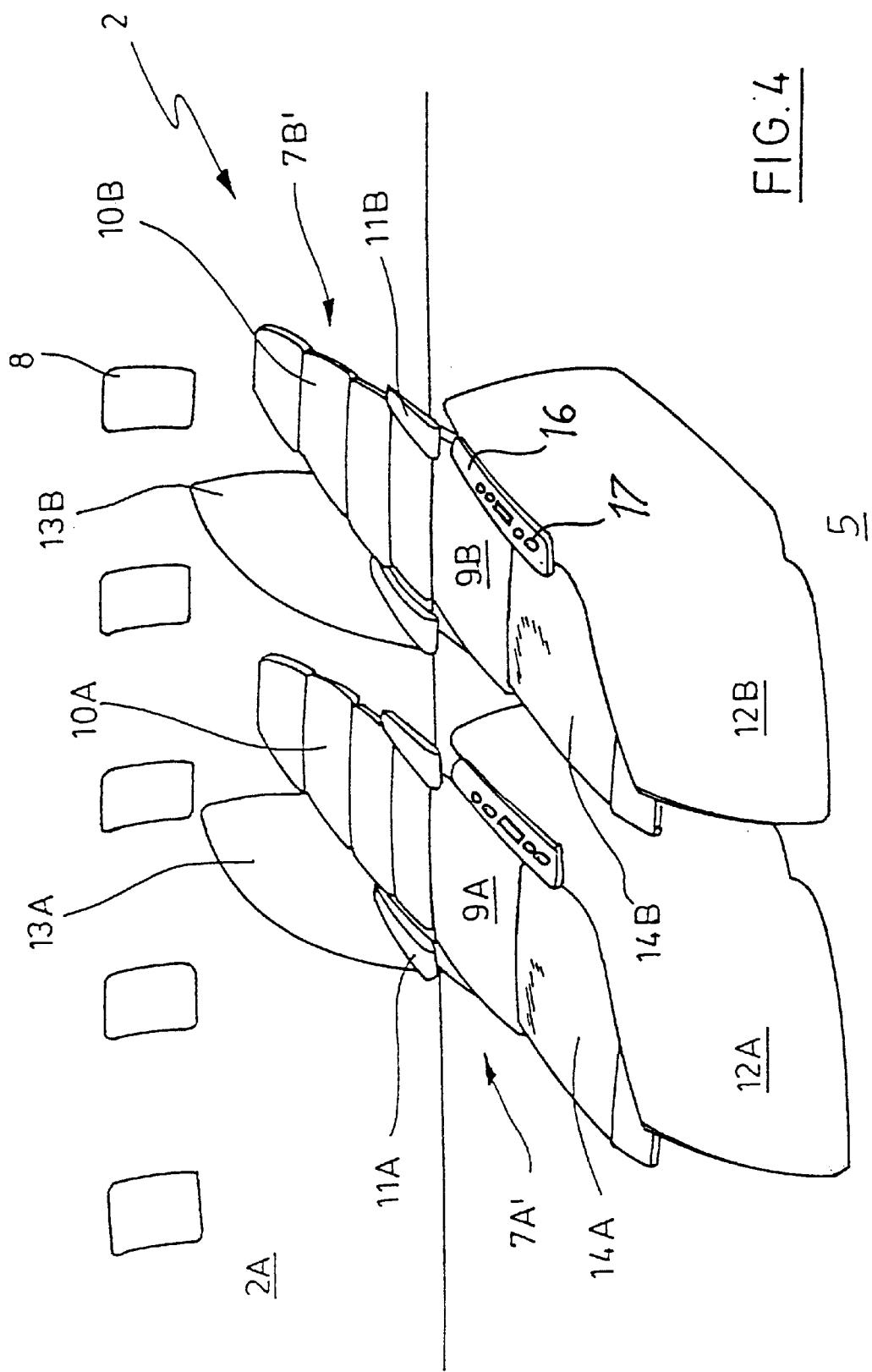
FIG. 4 is a view similar to FIG. 3 of the passenger seat arrangement according to FIG. 3, whereby the passenger seats have now been readjusted into the lying or reclining configuration.
Figure 5:
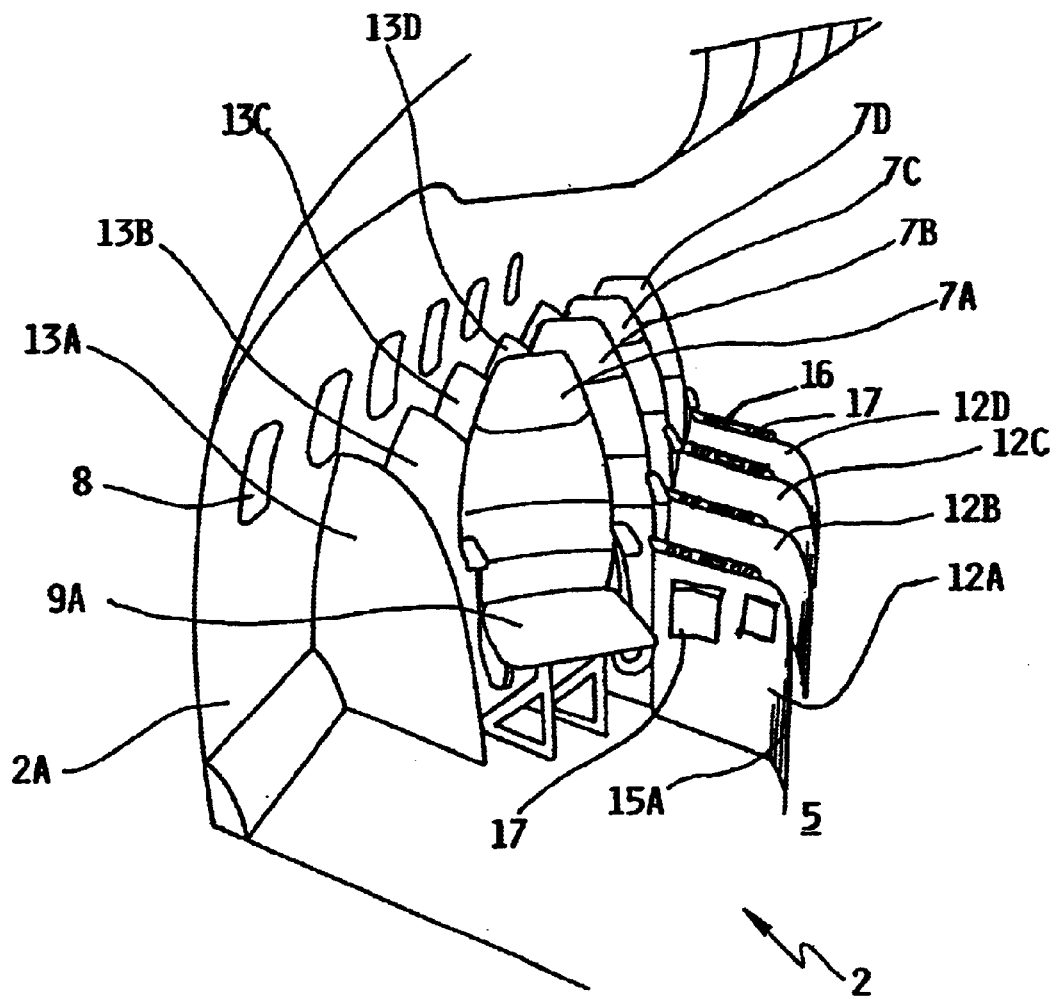
FIG. 5 is a schematic perspective view of the inventive passenger seat arrangement within the passenger cabin during the take-off and landing phases of a flight.

In FIG. 1, the inwardly-turned orientation in combination with the reclining configuration is schematically shown and indicated with the reference number 7'. FIGS. 3 and 5 show the inwardly turned orientation in combination with the upright seating configuration, while FIG. 4 shows the inwardly-turned orientation in combination with the reclining or sleeping configuration.

Figure 2:
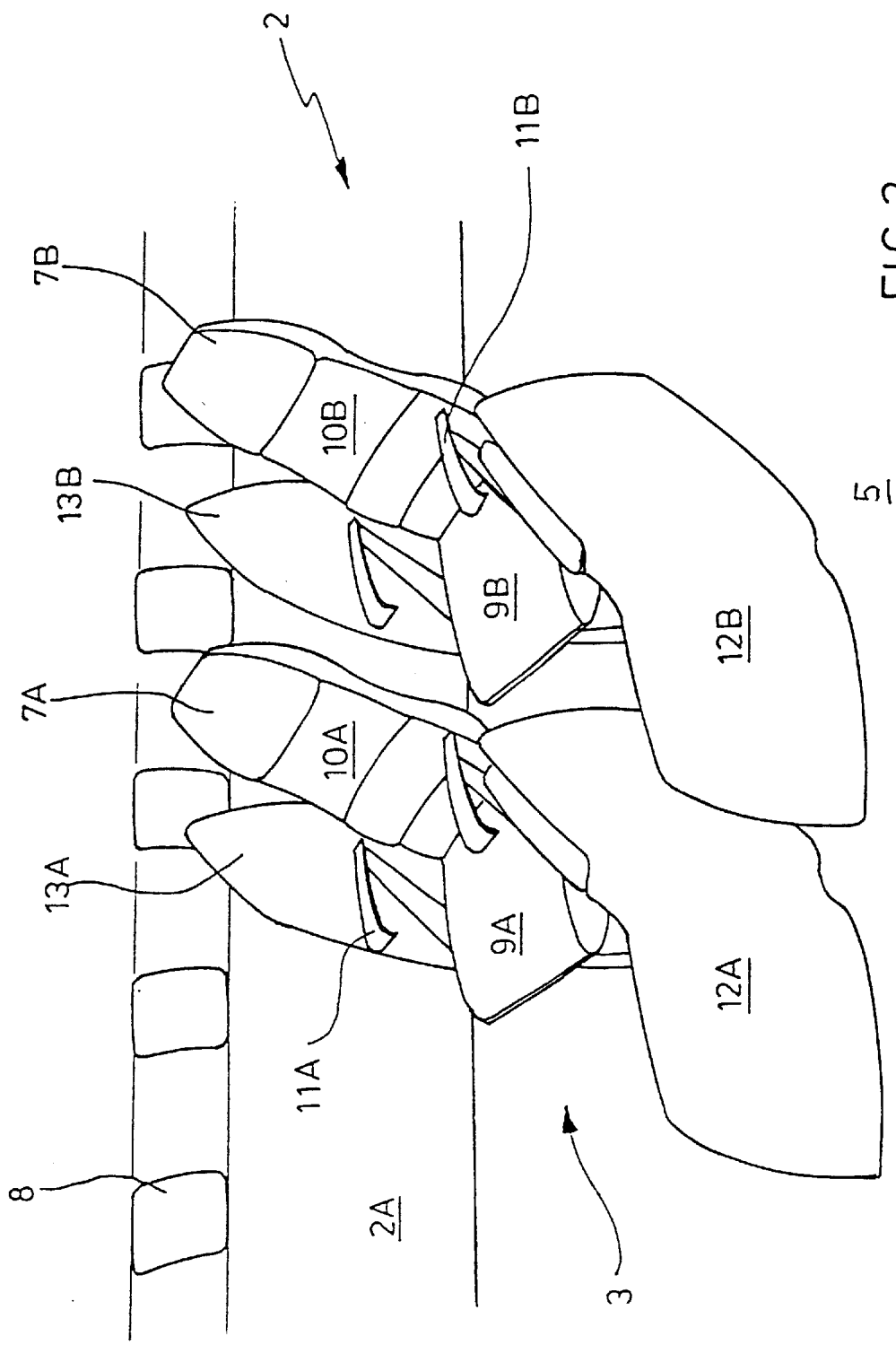
FIG. 2 is a schematic perspective view of a portion of a passenger cabin equipped with the inventive passenger seats arranged in an upright seating configuration and a forward-facing orientation for the take-off and landing phases of a flight.

FIG. 2 is a perspective view of a portion of the passenger cabin 2, in the area of the outside wall 2A which is provided with cabin windows 8. Two individual or single seats 7A and 7B are arranged in the generally forward-facing orientation for a take-off or landing phase, within the passenger cabin 2. These two single seats 7A and 7B represent an example of the arrangement of all of the outside seats 7 of the entire passenger seat arrangement 3 as shown in FIG. 1. Due to the slight pivoting or rotation of the seats 7A and 7B from a direct forward-facing alignment into the preferred rotational angular range (preferably up to about 18°) of the generally forward-facing orientation according to the invention, the accessibility to the passenger seats 7A and 7B as well as the leg room for a seated passenger are improved.

As further evident in FIG. 2, each passenger seat 7A or 7B respectively comprises a seat bottom 9A or 9B, a backrest 10A or 10B that is adjustably tiltably arranged relative to the seat bottom, as well as armrests 11A or 11B. Moreover, each seat 7A or 7B can be equipped or combined with a wall separator wall or partition 13A or 13B, to provide some degree of privacy screening relative to the adjacent seats 7, and an aisle separator wall or partition 12A or 12B to provide a protected personal space that is separated or partitioned from the aisle 5. These features give the passenger a feeling of a protected personal space and also help avoid tripping hazards in the aisle 5. The term "privacy screening" herein does not require a complete enclosure or partition providing complete privacy, but rather simply relates to the minimum partition necessary to provide a separation or bounding of a personal sphere of space, either physically or visually.

FIG. 3 shows the same portion of the passenger cabin 2 according to FIG. 2, whereby the passenger seats 7A and 7B have been rotated further into the inwardly-turned orientation indicated by the reference numbers 7A' and 7B'. Such an inwardly-turned orientation provides greater comfort, space and accessibility than prior typical seat arrangements, which is especially desirable during long flight phases. As mentioned above, the adjustment from the generally forward-facing orientation shown in FIG. 2 to the inwardly-turned orientation shown in FIG. 3 simply involves rotating the seats 7 to an orientation in a range between 50 and 60° relative to the longitudinal axis of the aircraft.

While FIG. 3 shows the seats 7A' and 7B' in the upright seating configuration, in the inwardly-turned rotational orientation, this orientation also provides sufficient space to adjust the seats 7A' and 7B' into the reclining or lying configuration, for example as shown in FIG. 4. Especially during long distance flights, it can be very comfortable for the passengers to adjust the passenger seats 7A or 7B into the inwardly-turned orientation and then particularly into the reclining or lying configuration of the seats 7A' and 7B' as shown in FIG. 4. Adjusting the seat 7A' or 7B' into the reclining or lying configuration as shown in FIG. 4 simply involves tilting down the backrest 10A or 10B, lowering the armrests 11A or 11B if necessary, and possibly also extending, e.g. pulling out, an extendable foot and leg rest 14A or 14B, so as to provide an overall substantially flat horizontal configuration in the manner of a reclined chair or a chaise longue or a sleeping couchette.

All of the adjustments of the respective seats 7 can be carried out in any conventionally known manner, for example by manual mechanisms, or power driven mechanisms actuated by electric motors or the like. This applies to the rotation of the seats to the selected rotational orientation, as well as the reclining tilting of the seat into the selected upright or reclined configuration.

In order to provide a sense of privacy and to avoid a feeling of being too close to the neighboring passenger, also in the reclined configuration of the seats 7A' and 7B', the above-mentioned wall separating walls or wall partitions 13A and 13B are arranged respectively on the side of each seat 7A' or 7B' to provide privacy shielding or screening relative to the neighboring seat. The wall partition 13A or 13B extends at least from the rear edge of the seat bottom 9A or 9B along a side of the backrest 10A or 10B, outwardly to the outside wall 2A of the cabin 2 in the area of the lower edge of the cabin windows 8, so as to provide a private space shielded from the neighboring passengers, when the backrest 10A or 10B is reclined. The wall partition 13A or 13B is positioned and arranged next to or directly on the side of the passenger seat 7A' or 7B' in such a manner so that the rotational movement of the seat between the forward-facing orientation and the inwardly-turned orientation is not hindered in any way. The wall partitions 13A or 13B may be made of a translucent material to allow light to pass therethrough, and furthermore, the incident light from the direction of the cabin windows 8 will not be blocked in any event if the wall partitions 13A or 13B end below the bottom edge of the cabin windows 8.

The aisle separating wall or aisle partition 12A or 12B is respectively allocated to and arranged adjacent to a side of the respective passenger seats 7A' or 7B'. The aisle partition 12A or 12B is relatively low in height, so as to achieve an adequate screening or shielding of the legs and lower body of the passenger in the seated and the reclined configurations of the seat, without blocking the seated passenger's shoulder space and line-of-sight view into the passenger cabin 2, in order to provide an adequate visual communication with the environment inside the passenger cabin 2. In a further detailed embodiment, the aisle partition 12A or 12B can be provided with an extended armrest or countertop surface 16 or the like. The aisle partition 12A or 12B, or the wall partition 13A or 13B, may further be equipped with passenger service elements and controls 17, including, for example, a video monitor, a telephone, flight attendant call buttons, lights and light controls, audio output jacks and controls, accessory power jacks, other communication elements, and storage or waste disposal containers, pockets, or the like, as well as housing a folding table directly in the partition wall 12A or 12B. In this case, such passenger service components can be omitted from the actual seats 7A' or 7B' themselves, so as to simplify the seats.

Figure 6:
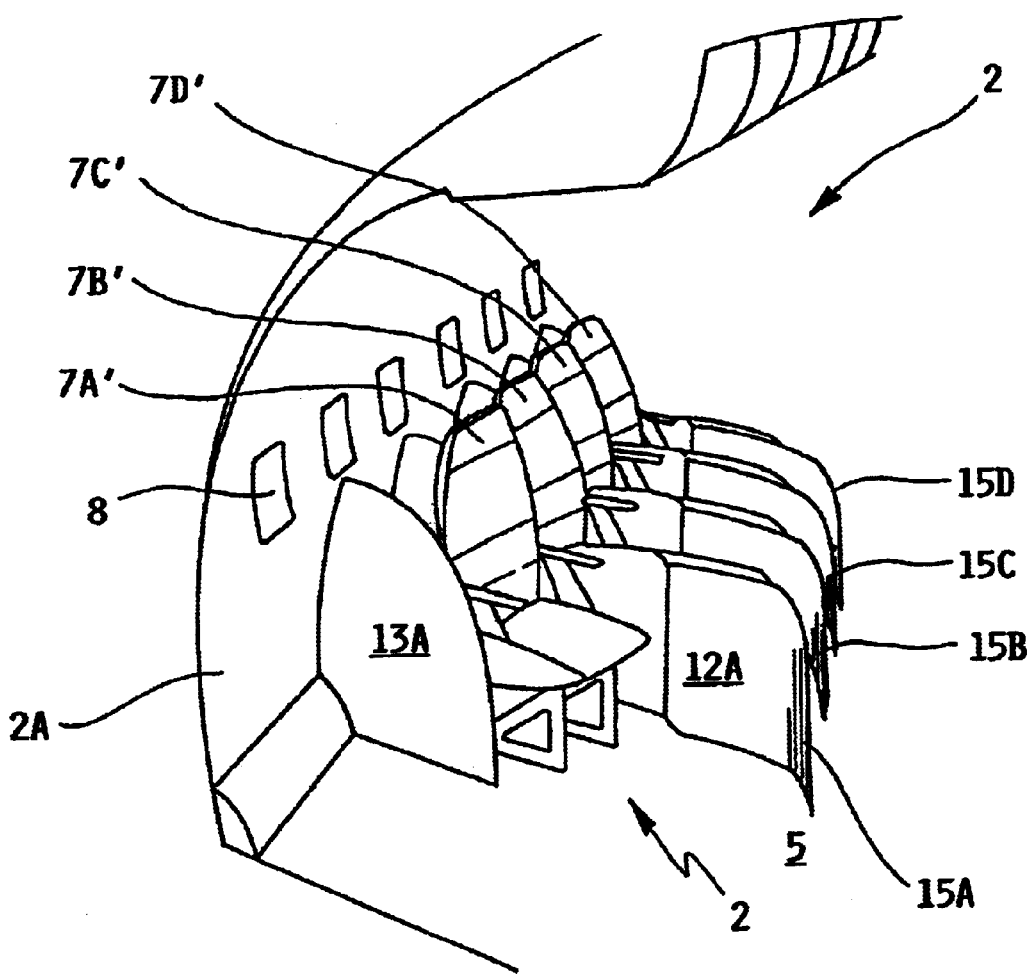
FIG. 6 is a view similar to that of FIG. 5, but showing the inventive passenger seat arrangement reoriented into an orientation for cruise flight.

FIGS. 5 and 6 are perspective views of the pertinent portion of the aircraft cabin 2 showing outside seats 7A, 7B, 7C and 7D. In FIG. 5, these seats are shown in the upright seating configuration and in the generally forward-facing orientation, suitable for take-off and landing. On the other hand, FIG. 6 shows these seats with reference numbers 7A', 7B', 7C' and 7D', in the upright seating configuration, but rotated into the inwardly-turned orientation suitable for cruise flight. In this particular embodiment of FIGS. 5 and 6, the wall partitions 13A, 13B, 13C and 13D are fixed on the cabin floor and the outside wall 2A of the cabin 2. Similarly, the aisle partitions 12A, 12B, 12C and 12D are fixed on the cabin floor, or arranged to be pivotable within a limited range, in order to screen and define the space allocated to a passenger assigned to a given seat. As a further optional embodiment, extendable partition extensions or blinds 15A, 15B, 15C and 15D can be arranged to be extendable from the basic aisle separating partitions 12A to 12D and/or the wall separating partitions 13A to 13D. For example, such blinds 15A to 15D may be flexible members that can be deployed in the manner of a fan, or a roll-top desk cover, or a rolled or pleated window shade, or the like, in order to achieve an individual adaptation of the degree of screening desired by the particular passenger. FIG. 5 also schematically shows the extended armrest or countertop ledge 16 as well as the passenger service elements and controls 17 that have been described above in connection with FIG. 4.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. While the present invention has been described in the context of a passenger cabin of an aircraft, it should be understood that the inventive seating arrangement is also suitable for use in other passenger transport vehicles, including busses, trains, and ships, for example.

What is claimed is:

1. In a passenger cabin of a passenger transport aircraft that extends longitudinally along a longitudinal axis, is bounded by an outside cabin wall, and has passenger seats and at least a first aisle therein, an improvement wherein:
said passenger seats comprise a single column of single-place individual seats arranged between said first aisle and said outside cabin wall closest to said first aisle;
each one of said individual seats includes a seat bottom and a backrest arranged selectively tiltably reclinable relative to said seat bottom;
each one of said individual seats is selectively adjustable between an upright seating configuration with said backrest relatively upright, and a reclined lying configuration with said backrest relatively downwardly reclined;
each respective one of said individual seats is selectively rotatable about an individual rotation axis of said respective individual seat, independently of a directly neighboring other one of said individual seats, to be rotationally positioned in a relatively forward-facing orientation in which said individual seat faces relatively forward in said passenger cabin during take-off and landing phases of operation of said aircraft, and a relatively inwardly-turned orientation in which said individual seat faces relatively inwardly toward a centerline of said passenger cabin along said longitudinal axis during a cruise flight phase of operation of said aircraft;
a sufficient space for a respective one of said individual seats to be adjusted to said reclined lying configuration is available only when said respective individual seat is respectively rotationally positioned in said relatively inwardly-turned orientation; and
each one of said individual seats is directly adjacent to and directly accessible by a passenger from said first aisle, in both said relatively forward-facing orientation and said relatively inwardly-turned orientation.

2. The improvement in the passenger cabin according to claim 1, wherein said relatively inwardly-turned orientation is an orientation of said individual seats turned toward said centerline and facing in a direction extending at an angle of 50° to 60° relative to said longitudinal axis.

3. The improvement in the passenger cabin according to claim 1, wherein said relatively forward-facing orientation is an orientation of said individual seats facing generally forwardly in said passenger cabin at an angle of 0° to 18° relative to said longitudinal axis.

4. The improvement in the passenger cabin according to claim 3, wherein said angle is at least 8°.

5. The improvement in the passenger cabin according to claim 1, wherein each one of said individual seats further comprises adjustable armrests that are raised in said upright seating configuration and are lowered in said reclined lying configuration.

6. The improvement in the passenger cabin according to claim 1, wherein each one of said individual seats further comprises an adjustable foot and leg rest that is lowered or retracted in said upright seating configuration and is raised or extended in said reclined lying configuration.

7. The improvement in the passenger cabin according to claim 1, further comprising a respective wall partition arranged at a side of each respective one of said individual seats oriented generally toward said outside cabin wall and between said respective one of said individual seats and an adjacent one of said individual seats to provide privacy screening therebetween.

8. The improvement in the passenger cabin according to claim 7, wherein said wall partition extends adjacently along said backrest of said respective one of said individual seats, and from there to said outside cabin wall at an area of a bottom edge of cabin windows provided in said outside cabin wall.

9. The improvement in the passenger cabin according to claim 7, further comprising a flexible partition extension that is selectively extendable from said wall partition.

10. The improvement in the passenger cabin according to claim 1, further comprising a respective aisle partition arranged at a side of each respective one of said individual seats oriented generally toward said aisle and between said respective one of said individual seats and an adjacent one of said individual seats to provide privacy screening therebetween.

11. The improvement in the passenger cabin according to claim 10, wherein said aisle partition extends adjacently along said seat bottom of said respective one of said individual seats, and from there toward said first aisle to an end point corresponding to the maximum extension of said respective one of said individual seats toward said first aisle when said respective individual seat is in said inwardly-turned orientation and said reclined lying configuration.

12. The improvement in the passenger cabin according to claim 10, further comprising a flexible partition extension that is selectively extendable from said aisle partition.

13. The improvement in the passenger cabin according to claim 10, further comprising a respective wall partition arranged at a side of each respective one of said individual seats oriented generally toward said outside cabin wall and between said respective one of said individual seats and an adjacent one of said individual seats to provide privacy screening therebetween.

14. The improvement in the passenger cabin according to claim 1, further comprising a privacy partition that extends along a side of at least one of said seat bottom and said backrest of each respective one of said individual seats, and passenger service elements selected from the group consisting of video monitors, loudspeakers, audio output jacks, power supply jacks, lights, light controls, flight attendant call buttons, audio and video controls, air vents, communication devices, storage and waste disposal containers, and foldable tables, arranged on said privacy partition.

15. The improvement in the passenger cabin according to claim 1, further comprising respective multiple-seat groups arranged on a side of said first aisle opposite said individual seats, wherein each one of said multiple seat groups respectively comprises plural seats that are not rotatable and are fixedly oriented in a forward-facing orientation facing forward parallel to said longitudinal axis.

16. The improvement in the passenger cabin according to claim 15, wherein a first seat pitch spacing of successive ones of said individual seats is less than a second seat pitch spacing of successive ones of said multiple-seat groups.

17. The improvement in the passenger cabin according to claim 16, wherein said first seat pitch spacing is from 60 to 70 % of said second seat pitch spacing.

18. The improvement in the passenger cabin according to claim 15, wherein said passenger cabin further has a second aisle therein parallel to said first aisle on a side of said multiple-seat groups opposite said first aisle, and a second outside cabin wall closest to said second aisle, and wherein said improvement further comprises additional ones of said individual seats arranged linearly along another single column of said individual seats between said second aisle and said second outside cabin wall.

19. The improvement in the passenger cabin according to claim 1, wherein every one of said passenger seats in said passenger cabin is directly adjacent to an aisle on at least one side thereof.

20. The improvement in the passenger cabin according to claim 1, wherein each one of said individual seats, in said reclined lying configuration, is configured as a chaise lounge providing an overall substantially flat lying support surface for a passenger to lie thereon.

21. The improvement in the passenger cabin according to claim 1, wherein a rotation range of each one of said individual seats is positively limited to allow rotation of each one of said individual seats only between said relatively forward-facing orientation and said relatively inwardly-turned orientation.

22. The improvement in the passenger cabin according to claim 1, further comprising a respective privacy partition extending along a side of and fixedly connected to each respective one of said individual seats.

* * * * *